United States Patent [19]

Mizukami et al.

[11] Patent Number: 4,902,314

[45] Date of Patent: Feb. 20, 1990

[54] GAS FILTER

[75] Inventors: Hiroshi Mizukami, 2-6-14, Takatori, Sawaraku, Jukuoka-Shi, Hukuoka; Hideo Tukazaki, Toride, both of Japan

[73] Assignees: Hidetoshi Nakajima, Tokyo; Hiroshi Mizukami, Hukuoka; Kuniaki Watanabe, Chiba, all of Japan

[21] Appl. No.: 354,708

[22] Filed: May 22, 1989

Related U.S. Application Data

[63] Continuation-in-part of Ser. No. 125,620, Nov. 25, 1987, abandoned.

[51] Int. Cl.[4] .............................................. B01D 39/20
[52] U.S. Cl. .................................... 55/97; 55/502; 55/523
[58] Field of Search .................... 55/97, 502, 523, 524

[56] References Cited

U.S. PATENT DOCUMENTS

| 3,937,015 | 2/1976 | Akado et al. ............... 55/523 X |
| 4,416,675 | 11/1983 | Montierth ................... 55/523 X |
| 4,419,108 | 12/1983 | Frost et al. ................... 55/97 |
| 4,568,595 | 2/1986 | Morris ....................... 55/523 X |

FOREIGN PATENT DOCUMENTS

| 59-48646 | 11/1984 | Japan. |
| 61-192280 | 8/1986 | Japan. |
| 61-271096 | 12/1986 | Japan. |

OTHER PUBLICATIONS

Publication entitled "Ceraflo Asymmetric Ceramic Microfilters" by Norton Company.

Primary Examiner—Charles Hart
Attorney, Agent, or Firm—Donald W. Hanson

[57] ABSTRACT

Disclosed herein is a gas filter particularly suitable for the filtration of dry gases used in the manufacture of the semiconductors. The gas filter comprises a ceramic honeycomb structural body with numerous gas flow holes and a fine ceramic film coated onto the inner surfaces of the gas flow holes. Filtration is performed by passing the gas to be filtered from the outer peripheral surface of the honeycomb structural body to the gas flow holes.

5 Claims, 3 Drawing Sheets

GAS FILTER

This application is a continuation-in-part of U.S. patent application Ser. No. 125,620 filed Nov. 25, 1987 and now abandoned.

BACKGROUND OF THE INVENTION (1) Field of the Invention:

The present invention relates to a gas filter particularly suitable for the filtration of dry gases used in the manufacture of semi-conductor devices.

(2) Description of the Prior Art:

As well known, various gaseous fluids are used in the production of semi-conductor devices. As recently seen in LSI or VLSI technology, integrated circuits have come to be even more highly integrated and also the pattern sizes have become smaller and smaller. As a consequence, the requirments for the treatment of the gaseous fluids used for etching have been made more stringent, e.g., the fluids must be treated, such as by filtering, so that particulates having diameters as small as $0.01\mu$ are removed whereas the prior standard was the removal of particulates as small as $0.05\mu$.

Heretofore, various filters have been used for filtration of such gaseous fluids, such filters including a filter having glass fibers shaped in a sheet-like or cylindrical form, and a filter having membrane films which are of polyfluorinated olefins such as those sold under the tradename teflon, are laminated in a disc-like form, or are formed into an element by a pleating operation. Since the filter containing glass fibers generally has a non-uniform hole or pore diameter, the filter is unsuitable for use as a filter for assuredly removing particles having particle sizes larger than a specific value. Furthermore, if a binder is mixed into the glass fibers when the glass fibers are formed into a sheet-like or cylindrical shape, the binder may react with various gases. Thus, binder cannot be used in such a filter. As a result, the glass fibers are likely to change positive relative to each other such that once captured particles may be released. In addition, there is the problem that metal components such as $Na^+$, $B^+$, etc., contained in the glass fibers may be drawn out by the gases and become a contaminating source for the semi-conductor devices.

In the filters using the membrane films, static electricity is likely to be produced in the membrane films, and thus foreign matter becomes attached to the primary side of the filter due to this static electricity. Although in one aspect, this exhibits a positive effect upon the filtration, the foreign matter is likely to attach to the primary side of the filter due to the static electricity even during the production of the filter. Since this foreign matter is not easily removed by means of clean air or the like, the matter remains attached to the produced filter. After the filter has been used for a long period of time, the foreign matter peels off from the secondary side to unfavorably cause the production of defective products. For example, even if a filter is manufactured in a clean room of Class 100 in which the number of particles of about $0.5\mu$ or less is not more than about $100/ft^3$, there is still the possibility that foreign matter of $0.5\mu$ is attached to the inside of the filter. In addition, with respect to the disc-shaped filter as well as the element-type filter obtained through the pleating operation, since there are extremely large trapped gas spaces, for instance, spaces between the discs, or in pleat-bent spaces, it takes an extremely long period to completely remove the foreign matter. Furthermore, although the Teflon-type membrane films of $0.2\mu$ or more are currently commercially available, a membrane film having pores of $0.1\mu$ or less is necessary in order to reduce the amount of foreign matter to present day standards. However, to produce a membrane film with such characteristics involves extremely large start-up costs. Moreover, the production of disc-type or pleat-type filters also involves extremely large start-up costs.

Since the degree of filtering provided by a gas filter has a predominant influence upon the fraction of defective semi-conductor devices produced, the enhancement of the performance of the gas filter is extremely desirable. However, as mentioned above, conventional gas filters have been able to meet the above demands. As shown in FIG. 4, there is a known filter in which a fine ceramic film 3 is formed on the inner surfaces of flow holes 2 of a core 1 shaped in the form of a ceramic honeycomb structural body. In use, liquid A is introduced from the upstream side (left-hand side) to the flow holes 2, and a filtrate is taken out from the outer peripheral surface of the core 1 through the ceramic film 3 while a pressure difference is created by appropriately throttling a pipe line on the downstream side by means of a valve 4. Foreign matter attached to the inner surfaces of the flow holes is cleaned off by the energy of the liquid flowing from the upstream side to the downstream side (right-hand side). Such a filter is called generally "cross flow system."

SUMMARY OF THE INVENTION

It is therefore an object of the present invention to provide a gas filter which can effectively remove extremely fine particles and is particularly suitable for filtering dry gases used in the manufacture of semi-conductor devices.

It is another object of the present invention to provide a gas filter which when used in the manufacture of semi-conductor devices, can reduce the fraction of defective devices produced to an extremely large extent.

It is still another object of the present invention to provide a gas filter which can be inexpensively produced.

It is a further object of the present invention to provide a method of filtering using the above gas filter.

According to one aspect of the present invention, there is provided a gas filter which comprises a ceramic honeycomb structural body having a number of gas flow holes with a generally circular cross-section and a fine ceramic film coated onto the inner surfaces of the gas flow holes, said body including a support layer having a thickness of more than about 2 mm and provided with pores having a diameter between about 10 and 15 $\mu$m formed between two adjacent gas flow holes to provide a bulkhead therebetween, wherein the gas to be filtered is passed from the outer peripheral surface to the structural body toward the gas flow holes.

According to another aspect of the present invention, there is provided a method a removing dust from a dry gas used in the manufacture of semiconductor devices, the method comprising providing a gas filter comprising a ceramic honeycomb structural body with a number of gas flow holes with a generally circular cross-section and a fine ceramic film coated onto the inner surfaces of the gas flow holes, said body including a support layer having a thickness of more than about 2 mm and provided with pores having a diameter between about 10 and 15 $\mu$m formed between two adjacent gas flow holes to provide a bulkhead therebetween, and passing a gas to be filtered from the outer peripheral surface of the honeycomb structural body up to the gas flow holes.

These and other objects, features and advantages of the invention will be appreciated upon a review of the following description of the invention when taken in conjunction with the attached drawings with understanding that some modifications, variations and changes may be easily accomplished by those skilled in the art to which the invention pertains without departing from the spirit of the invention or the scope of the claims appended thereto.

BRIEF DESCRIPTION OF THE DRAWINGS

For better understanding of the invention, reference is made to the attached drawings, wherein.

DETAILED DESCRIPTION OF THE PREFERRED EMBODIMENTS OF THE INVENTION

Upon having undertaken a strenuous study to obtain a filtration filter which diminishes the defects of the above-mentioned mentioned prior art techniques, it has been found that a gas filter which diminishes substantially all the defects of the prior art techniques in the gas filters of dry gases for producing semi-conductors can be obtained by providing a gas filter using the previously-mentioned ceramic film in which a gas is passed to the inner peripheral surfaces of flow holes from the outer peripheral surface of a ceramic honeycomb structural body.

That is, the present invention comprises a ceramic honeycomb structural body having numerous gas flow holes with a generally circular cross-section and fine ceramic film coated on the inner surfaces of the gas flow holes, and is characterized in that said body including a support layer having a thickness of more than about 2 mm and provided with pores having a diameter between about 10 and 15 μm formed between two adjacent gas flow holes to provide a bulkhead therebetween and that a gas to be filtered is passed from the other peripheral surface of the honeycomb structural body into the gas flow holes.

Embodiments according to the present invention will be explained with reference to the drawings, but it should be understood that they are merely illustrative of the invention and should not be interpreted to limit the scope thereof.

Figure 1:
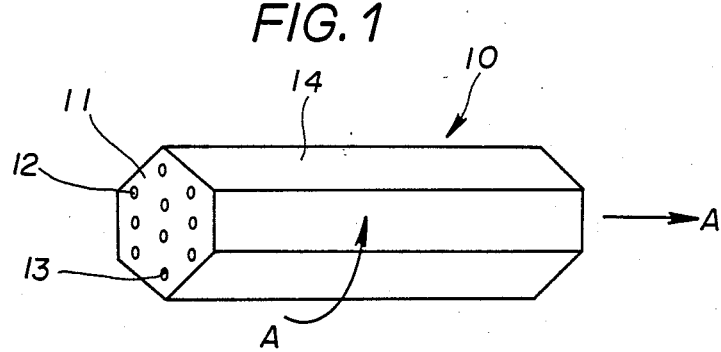
FIG. 1 is a perspective view of one embodiment of a gas filter according to the present invention.

In FIG. 1, shown is one embodiment of a filter according to the present invention, the filter 10 comprising a core 11 of a hexagonal column-shaped, ceramic honeycomb structural body in which numerous holes 12 are formed, and a fine ceramic film 13 coated onto the inner surfaces of the flow holes 12. A gas A is filtered while going from the outer peripheral surface 14 to the flow holes 12 of the core 11, and a filtered gas is discharged to the outside of the filter through the flow holes 12.

The ceramic structural body, as was mentioned previously, has gas flow holes of generally circular cross-section. Furthermore, the structural body includes a support layer having a thickness of more than about 2 mm and provided with pores having a diameter between about 10 and 15 μm formed between two adjacent gas flow holes to provide a bulkhead therebetween.

The illustrated embodiment is characterized in that gas A is filtered while being passed from the outer peripheral surface 14 to the flow holes 12 of the core 11. By so doing, the effect is that the gas flow rate does not change much during filtration because the filtering area of the ceramic film having a high filtering accuracy is quite wide. In addition, since the gas is straightly filtered without forming trapped gas portions, it becomes extremely easy to clean off and remove particles attached to the filter after the filtration. Specifically, when a clean gas is reversely passed through the gas filter, the particles are straightly removed.

In operation of the filter, dust having a diameter greater than that of the holes or pores of the structural body is trapped by the outer peripheral surface of the body. Dust having a diameter smaller than that of the pores is trapped on the wall surface of the structural body due to inertia of the dust when the dust impinges upon the wall surface of the body. Furthermore, super-fine particles which do not undergo influences of the above-described inertia are trapped on the wall surface of the fine ceramic film having pores of small diameter through diffusion. As a consequence, clogging of the filter is prevented and the filter can be used for a long period of time. The filtered gas produced can be used in semiconductor device manufacture since it contains almost no super-fine particulates.

Figure 2:
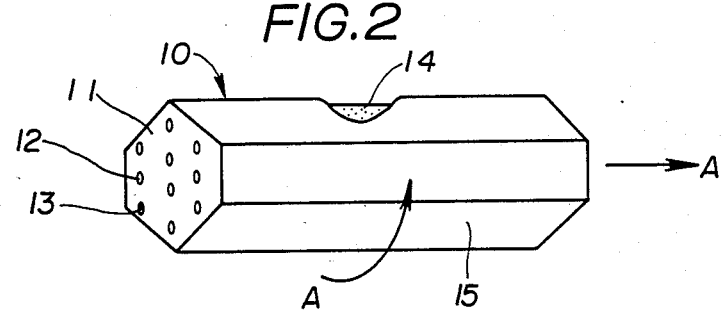
FIG. 2 is a perspective view of another embodiment of a gas filter according to the present invention.

FIG. 2 shows another embodiment according to the present invention in which a ceramic film 15 which is slightly coarser than the ceramic film 13 coated onto the inner surfaces of the flow holes is applied onto the outer peripheral surface 14 of the ceramic core. With such a construction, the filtration is conducted in two stages, so that the amount of foreign matter contained into the filtered gas is decreased even further.

According to these embodiments of the invention, the ceramic core is formed in a honeycomb fashion. By so doing, although an extremely large vertical load is applied onto the ceramic core when it is housed into a casing which needs to be sealed with a gasket made of Teflon, the ceramic core is unlikely to be broken and it exhibits considerable strength against external impacts.

The construction of the ceramic structural body has several important structural features. By having the gas flow holes of circular cross-section, these holes receive gas pressure evenly which enhances the efficiency of the filter. In addition, since a filter according to the invention has a relatively thick support layer and has a circular cross-section of the gas flow holes, it is therefore highly resistive to stress. Consequently, the filter is very suitable for gas filtering operations, particularly when the gas is under relatively high pressure.

Furthermore, it should also be emphasized that any system or technique for particulate removal from a fluid such as a gas which utilizes a filter is always accompanied by the problem of choking or clogging caused by dirt particles filling the fine mesh of the filter. This choking or clogging can significantly reduce the gas flow rate and cause a pressure loss. Therefore, in most systems, certain measures for raising the primary pressure are required in order to maintain the gas flow rate at an adequate level for the intended use of the gas, in the present application, for the production of semiconductor devices. With gas filters constructed according to the present invention, a support layer is provided having a thickness greater than 2 mm and thus the filter can structurally withstand a pressure up to 100 kg/cm$^2$. Furthermore, the casing of the filter typically can structurally withstand a pressure up to 175 kg/cm$^2$. Thus, the structural strength of the subject gas filter enables the filter to easily withstand gas pressure modifications made in response to choking or clogging of the filter itself. A support layer having a thickness greater than about 2 mm can also help safely protect the inner ceramic film by absorbing shocks such as when the filter is subjected to pulse waves that can be instantaneously generated within the filter system during large pressure changes such as those that occur during start-up of the gas filtration system.

The ceramic film comprising film ceramic particles is coated onto the inner surface of the flow holes. Since it is easy to convert a ceramic to the desired fine particles, the fine film having fine holes of 0.1$\mu$ or less can be easily obtained.

The ceramic honeycomb structural body used in the present invention and the application of the fine ceramic film thereto may be both publicly known and the fine ceramic film can be applied according to he known method. For the ceramic honeycomb structural body, use may be favorably made, for instance, of a filter primarily consisting of alumina which is commercially available in the name of "Ceraveil Ceramic Filter" as manufactured and distributed by Toshiba Ceramics Company. Other suitable constructions for the filter are disclosed in a paper presented at the FILTRA Conference (Societe Francaise de Filtration), Paris, France, on Oct. 2-4, 1984, entitled "New Ceramic Filter Media for Cross-flow Microfiltration and Ultrafiltration" and authored by J. Gillot and D. Garcera.

The percentage of extremely fine particles removed from the use of the filter shown in FIG. 2 was measured, and results thereof are summarized below.

Figure 3:
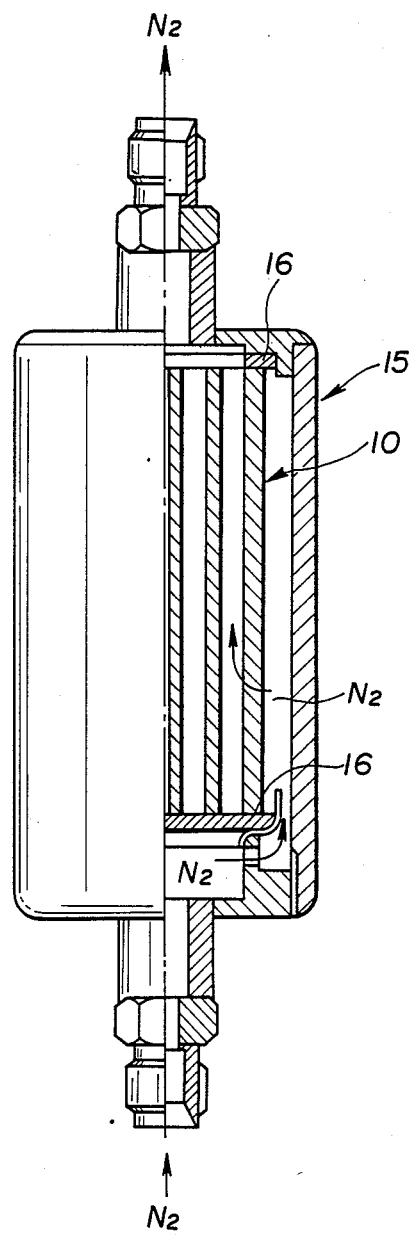
FIG. 3 is a partially sectioned view of a casing which houses a gas filter according to the present invention.
Figure 4:
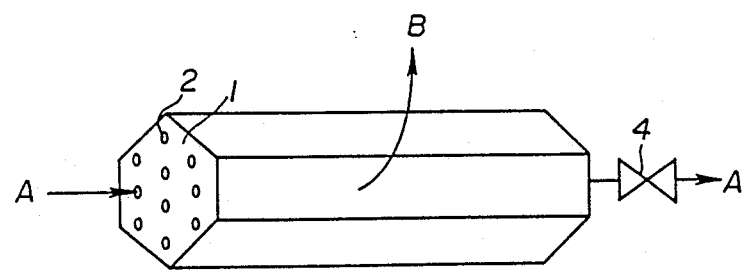
FIG. 4 is a perspective view of a prior art filter.

In the measurement, filter tube 10 according to the present invention had a ceramic film, with 0.1 holes applied to the inner surfaces of the flow holes, and a ceramic film with 0.2$\mu$ holes applied onto the outer peripheral surface. The filter 10 was housed in casing 15 sealed with the Teflon gasket 16 as shown in FIG. 3. Contaminated N$_2$ gas was passed through the thus constructed gas filter at a flow rate of about 280 cc/min, and the amount of extremely fine particles in the filtered gas were measured by using a coagulated nuclei measuring instrument. The results of the measurement result showed that extremely fine particles of 0.005$\mu$ were removed at 99.99998%.

As mentioned in the aforegoing, according to the present invention, since extremely fine particles can be effectively removed, the invention exhibits, particularly as a filter of dry gas for use in the manufacture of semiconductors, remarkable effects which have not been observed with respect to prior art filters of such a type.

We claim:

1. A gas filter for removing dust from a dry gas used in the manufacture of semiconductor devices, the gas filter comprising a ceramic honeycomb structural body with a number of gas flow holes with a generally circular cross-section and a fine ceramic film coated onto the inner surfaces of the gas flow holes, said body including a support layer having a thickness of more than about 2 mm and provided with pores having a diameter between about 10 and 15 $\mu$m formed between two adjacent gas flow holes to provide a bulkhead therebetween, wherein the gas to be filtered is passed from the outer peripheral surface of the honeycomb structural body toward the gas flow holes.

2. A gas filter according to claim 1, wherein the filter was sealed with a Teflon gasket.

3. A method of removing dust from a dry gas used in the manufacture of semiconductor devices, the method comprising providing a gas filter comprising a ceramic honeycomb structural body with a number of gas flow holes with a generally circular cross-section and a fine ceramic film coated onto the inner surfaces of the gas flow holes, said body including a support layer having a thickness of more than about 2 mm and provided with pores having a diameter between about 10 and 15 $\mu$m formed between two adjacent gas flow holes to provide a bulkhead therebetween, and passing a gas to be filtered from the outer peripheral surface of the honeycomb structural body up to the gas flow holes.

4. A method according to claim 3, wherein a ceramic film having fine holes of 0.1$\mu$ or less is formed onto the inner surfaces of the flow holes.

5. A method according to claim 3, wherein the filter was sealed with a Teflon gasket.

* * * * *